A. S. STENBORG.
BEARING FOR CREAM SEPARATORS.
APPLICATION FILED APR. 4, 1911.
1,059,500.
Patented Apr. 22, 1913.
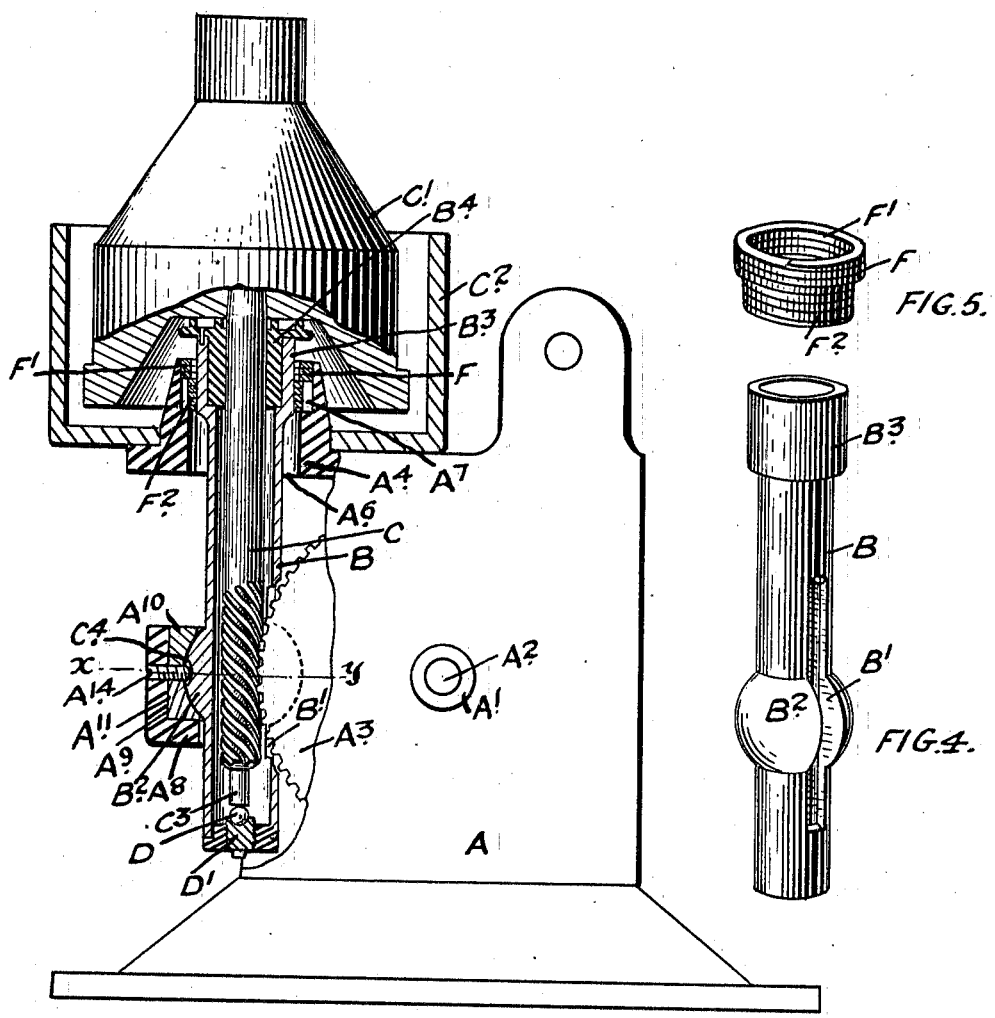
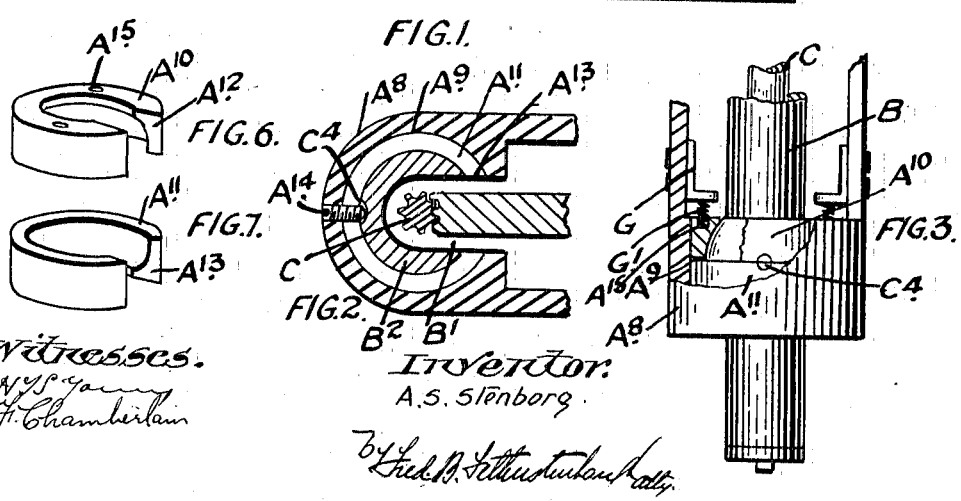
Witnesses.
Inventor:
A. S. Stenborg.

UNITED STATES PATENT OFFICE.

AMAUDUS SIGFRID STENBORG, OF GUELPH, ONTARIO, CANADA.

BEARING FOR CREAM-SEPARATORS.

1,059,500.  Specification of Letters Patent.  Patented Apr. 22, 1913.

Application filed April 4, 1911. Serial No. 618,931.

*To all whom it may concern:*

Be it known that I, AMAUDUS SIGFRID STENBORG, of the city of Guelph, in the county of Wellington, in the Province of Ontario, Canada, have invented certain new and useful Improvements in Bearings for Cream-Separators, of which the following is the specification.

My invention relates to improvements in bearings for cream separators and the object of the invention is to devise means whereby the vertical worm spindle and centrifuge supported thereby are rendered self balancing thereby obviating the necessity of balancing the centrifuge when set in the machine and it consists essentially of a sleeve provided at one end with a vertical bearing through which the worm spindle extends and at the lower end with a ball step bearing on which the lower end of the worm spindle rests, a vertical slot extending through the sleeve at the inner side through which the main worm gear of the separator extends so as to mesh with the worm of the worm spindle, a spherical enlargement forming part of the sleeve and a socket bearing into which the spherical enlargement is fitted and held, the center of such enlargement and socket being located horizontally opposite the center of the worm gear of the separator and yieldably resilient means whereby the upper end of the sleeve is supported in the frame of the support as hereinafter more particularly described by the following specification.

Figure 1, is a side elevation mostly in section of my device. Fig. 2, is a plan section on line $x$—$y$ Fig. 1. Fig. 3, is a detail elevation partially in section of the socket bearing and sleeve mounted therein looking from the front. Fig. 4, is a detail of the worm spindle supporting sleeve. Fig. 5, is a perspective detail of the yieldable resilient means for supporting the upper end of the sleeve. Figs. 6 and 7 are perspective detail views of the members forming the socket for supporting the bearing sleeve of the worm spindle.

In the drawings like letters of reference indicate corresponding parts in each figure.

A is the main frame of the separator provided with the usual bearing $A'$ in which is supported the main shaft $A^2$ on which is mounted the usual worm gear $A^3$.

$A^4$ is an upper bearing extension of the main frame provided with a vertical orifice $A^6$ having an enlargement $A^7$ at its upper end.

$A^8$ is also an extension of the main frame forming the lower bearing socket support $A^9$.

$A^{10}$ and $A^{11}$ are socket members fitting within the socket support $A^9$. The members $A^{10}$ and $A^{11}$ are slotted at $A^{12}$ $A^{13}$.

B is the bearing sleeve for supporting the vertical worm spindle C of the separator. On the worm spindle C is supported the usual centrifuge $C'$ surrounded by the bowl $C^2$ secured to the main frame of the separator. The sleeve B is provided with a vertical slot $B'$, and a spherical enlargement $B^2$ through which the slot $B'$ also extends. The enlargement $B^2$ is designed to fit within the socket members $A^{10}$ and $A^{11}$ horizontally opposite the center of the worm gear $A^3$.

$B^3$ is an enlargement of the upper end of the sleeve B in which fits a suitable bushing $B^4$ through which extends the upper end of the worm spindle C.

D is a ball bearing held in a suitable cup $D'$ and forming a step bearing for the lower end $C^3$ of the worm spindle C.

$A^{14}$ is a set screw extending through the socket support $A^9$, through the socket members $A^{10}$ and $A^{11}$ into a recess $C^4$ formed in the spherical enlargement $B^2$. By this means the sleeve is prevented from turning in a horizontal plane within the socket.

F is a coil spring, the upper portion $F'$ of such spring being larger in diameter than the lower portion $F^2$. As will be seen from referring to Fig. 1 the upper portion $F'$ fits the internal periphery of the recess $A^7$ and the lower portion $F^2$ fits around the outer periphery of the enlargement $B^3$ of the sleeve B, with the lower end of the spring resting upon the shoulder formed by the bottom of the enlarged portion $A^7$. By this means the upper end of the sleeve is yieldably supported within the upper bearing portion $A^4$.

To hold the upper member $A^{10}$ of the socket $A^9$ in position and also to take up the wear I provide the following securing means. G are brackets secured to the main frame of the separator to each side of the socket support $A^9$. $G'$ are spiral springs extending into the recesses $A^{15}$ formed in the member $A^{10}$ and bearing at their upper end against the brackets G. By this means the socket member $A^{10}$ is securely held in place so as to take up the wear between the socket and the spherical portion of the sleeve B.

It will be seen from this description that the worm spindle C is supported within the sleeve B and that should the centrifuge be unevenly balanced the uneven motion will be taken up by the swing of the spherical portion $B^2$ in the socket formed by the members $A^{10}$ and $A^{11}$, the upper end being yieldably and resiliently supported thereby insuring the smooth running of the machine and minimizing the wear upon the gears.

What I claim as my invention is,

In a cream separator, the combination with the main frame and a socket support forming part of the main frame, of a horizontally divided member fitting within the socket support, an upper bearing portion, also forming part of the bearing frame, a sleeve provided with the spherical boss, designed to fit the aforesaid horizontally divided member, resilient means for supporting the upper end of the sleeve in the upper bearing portion, a worm spindle held within the sleeve in suitable bearings, a worm gear mounted in the main frame and meshing with the said spindle, brackets secured to the main frame, and compression springs held between the brackets and the upper portion of the horizontally divided member.

AMAUDUS SIGFRID STENBORG.

Witnesses:
MARGARET MAIM,
WALTER ELLIS BUCKINGHAM.

---

Copies of this patent may be obtained for five cents each, by addressing the "Commissioner of Patents, Washington, D. C."